Aug. 23, 1927.

W. S. ADAMS

BRAKE HANGER

Filed May 25, 1926

Inventor
Walter S. Adams
by his Attorneys

Patented Aug. 23, 1927.

1,640,228

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

BRAKE HANGER.

Application filed May 25, 1926. Serial No. 111,545.

My invention relates to certain improvements in brake hangers, for which patent was granted to S. N. Curwen on the 19th day of October, 1909, No. 937,512.

The object of the present invention is to increase the life of the socket member of the brake hanger by providing a hard metal bushing for the socket member which is secured to the socket member by spot-welding. On cutting the weld, the bushing can be removed and another substituted therefor when necessary.

Figure 1:
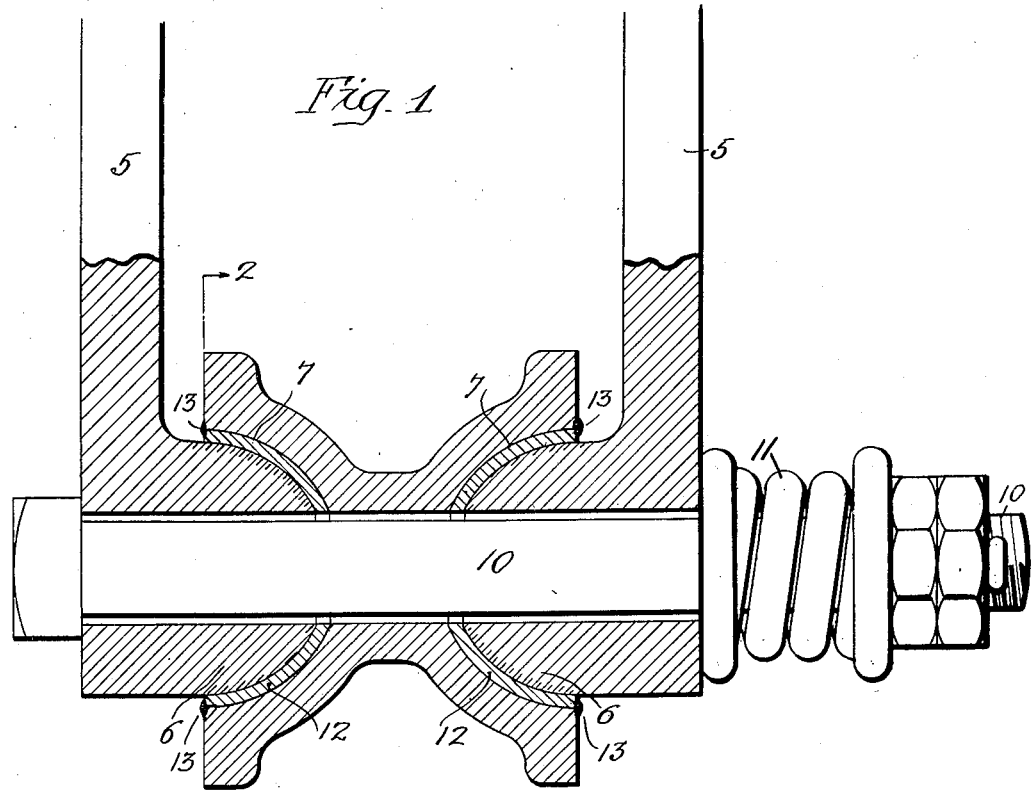
Fig. 1 is a view partly in section of the lower portion of a brake hanger illustrating my invention.
Figure 4:
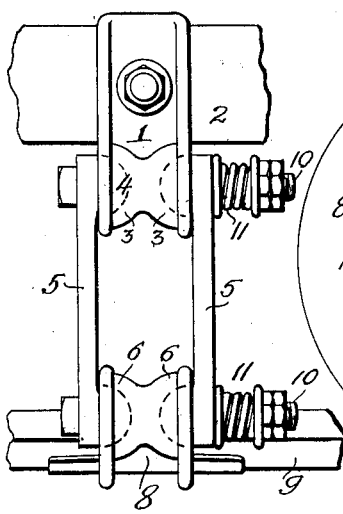
Fig. 4 is a side view of a brake hanger to which my invention is applied.

A bracket 1 is secured to the truck frame 2, as shown in Fig. 4. This bracket has two sockets 3—3 adapted to receive the upper semi-spherical projections 4—4 on the arms 5—5, which have semi-spherical projections 6—6 at their lowers ends adapted to sockets 7—7 in a lower bracket 8 which is secured to the brake beam 9 in the present instance.

The arms 5—5 are yieldingly held in their sockets by bolts 10—10 and springs 11.

The above is a brief description of the brake hanger of the patent noted above.

In this type of brake hanger, the walls of the sockets wear considerably, and the main object of this invention is to provide the sockets with a hard metal bushing, which is firmly attached to the bracket but which can be readily removed when it is necessary to replace the bushing.

Figure 2:
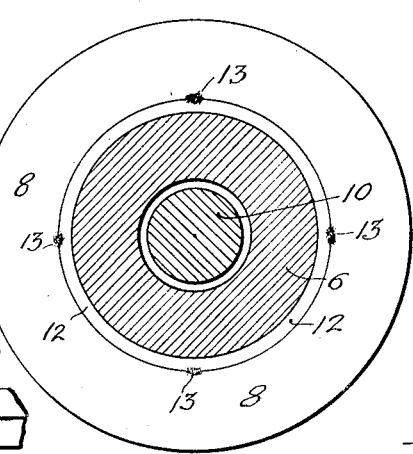
Fig. 2 is a sectional view on the line 2—2, Fig. 1.
Figure 3:
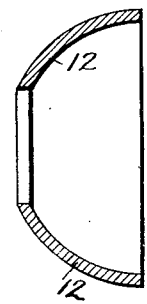
Fig. 3 is a detached sectional view of one of the bushings.

Each socket 7—7 of the bracket 8 has a hard metal bushing 12, which conforms to the shape of the socket and to the semispherical projections on the arms 5—5. The bushing may be made of manganese steel or other hard steel and is secured at its edge as shown at 13 by spot-welding, the weld preferably projecting beyond the surface of the bracket and bushing as shown, so that when it is necessary to remove the bushing, the welds can be chipped off, after which the bushing can be removed and replaced. The new bushing can be readily secured to the bracket by again spot-welding the parts as shown in Fig. 2.

The semi-spherical projections 6—6 are preferably case-hardened. The bracket may be made of maleable iron.

The above description refers to the lower portion of the brake hanger, but it will be understood that the upper portion of the hanger is made in the same manner as the lower portion.

I claim:—

1. The combination in a brake hanger, of two brackets spaced apart, each bracket having a socket at each side; hard metal bushings located in the sockets and attached to the brackets by spot-welding; and two arms, each arm having semi-spherical projections at each end adapted to the bushings in the brackets, the bearing surfaces of the projections being case-hardened.

2. The combination in a brake hanger, of a bracket having a socket at each side; hard metal bushings located in the sockets and attached to the bracket by spot-welding; and two arms, each arm having a semi-spherical projection adapted to the bushings in the bracket.

WALTER S. ADAMS.